(12) United States Patent
Aoyagi (10) Patent No.: US 11,098,671 B2
(45) Date of Patent: Aug. 24, 2021

(54) COMBUSTION CONTROL DEVICE

(71) Applicant: DENSO CORPORATION, Kariya (JP)

(72) Inventor: Kenji Aoyagi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/986,619

(22) Filed: Aug. 6, 2020

(65) Prior Publication Data

US 2020/0362790 A1 Nov. 19, 2020

Related U.S. Application Data

(63) Continuation of application No. PCT/JP2019/004637, filed on Feb. 8, 2019.

(30) Foreign Application Priority Data

Feb. 16, 2018 (JP) .............................. JP2018-026000

(51) Int. Cl.
*F02D 41/40* (2006.01)
*F02P 5/14* (2006.01)
*F02P 5/145* (2006.01)

(52) U.S. Cl.
CPC ............ *F02D 41/402* (2013.01); *F02P 5/145* (2013.01); *F02D 2200/0602* (2013.01); *F02D 2250/31* (2013.01)

(58) Field of Classification Search
CPC ................... F02D 41/40; F02D 41/402; F02D 2200/0602; F02D 2250/31; F02P 5/145
USPC ................................. 123/295–305, 481, 485
See application file for complete search history.

(56) References Cited

U.S. PATENT DOCUMENTS

| | | | | |
|---|---|---|---|---|
| 5,960,769 A * | 10/1999 | Mashiki | ................ | F02B 31/085 123/308 |
| 5,975,047 A * | 11/1999 | Kamura | .................. | F02D 37/02 123/305 |
| 7,066,149 B1 * | 6/2006 | Date | ..................... | F02D 33/006 123/457 |
| 2001/0018825 A1 * | 9/2001 | Kuji | ...................... | F02D 41/402 60/286 |
| 2016/0356229 A1 * | 12/2016 | Watanabe | ............. | F02D 41/064 |
| 2019/0107061 A1 * | 4/2019 | Inoue | .................... | F02D 41/401 |
| 2019/0112988 A1 * | 4/2019 | Inoue | .................... | F02D 45/00 |

FOREIGN PATENT DOCUMENTS

JP 4161828 8/2008

* cited by examiner

*Primary Examiner* — John Kwon
*Assistant Examiner* — Johnny H Hoang
(74) *Attorney, Agent, or Firm* — Nixon & Vanderhye P.C.

(57) ABSTRACT

A timing computation unit determines whether to execute compression latter-half injection to inject fuel in a latter half of a compression stroke of an internal combustion engine based on an operation state of the engine and computes an injection timing and an ignition timing of fuel. A timing correction unit corrects the computed injection timing to an advance side and corrects the computed ignition timing to a retard side, in a case where a detected fuel pressure is lower than a target fuel pressure. The timing correction unit corrects the computed injection timing to the retard side and corrects the computed ignition timing to the advance side, in a case where the detected fuel pressure is higher than the target fuel pressure. A combustion control unit controls a fuel injection device and an ignition device based on the injection timing and the ignition timing.

6 Claims, 6 Drawing Sheets

FIG. 9

COMBUSTION CONTROL DEVICE

CROSS REFERENCE TO RELATED APPLICATION

The present application is a continuation application of International Patent Application No. PCT/JP2019/004637 filed on Feb. 8, 2019, which designated the U.S. and claims the benefit of priority from Japanese Patent Application No. 2018-026000 filed on Feb. 16, 2018. The entire disclosures of all of the above applications are incorporated herein by reference.

TECHNICAL FIELD

The present disclosure relates to a combustion control device to control a combustion system to inject fuel to an internal combustion engine and to ignite the fuel.

BACKGROUND

An internal combustion engine of a directly injection type is equipped with a fuel injection valve to directly inject fuel into a combustion chamber.

SUMMARY

The present disclosure provides a combustion control device for a combustion system. The combustion system includes a fuel injection device to inject high-pressure fuel in a pressure accumulator into a combustion chamber of an internal combustion engine, an ignition device to ignite fuel in the combustion chamber, and a fuel pressure sensor to detect pressure of fuel to be injected into the combustion chamber.

BRIEF DESCRIPTION OF THE DRAWINGS

The above and other objects, features, and advantages of the present disclosure become clearer by the following detailed description with reference to the appended drawings. In the drawings.

DETAILED DESCRIPTION

Hereinafter, examples of the present disclosure will be described.

According to an example of the present disclosure, a control apparatus is for directly injecting fuel in a compression stroke of an internal combustion engine and for igniting the fuel. The control apparatus may suppress occurrence of knocking by substantially increasing propagation speed of flame at the time of ignition by using disturbance of a fuel spray which increases as the pressure of injection fuel becomes higher, and the ignition timing is made closer to MBT (Minimum spark advance for Best Torque). In this way, this example may increase an output of the internal combustion engine, while suppressing knocking.

In a case where an internal combustion engine is high-load operated, in some cases, the injection timing of fuel may be retarded to the latter half of a compression stroke of an internal combustion engine in order to suppress occurrence of knocking. On the other hand, when the injection timing is retarded to the latter half of a compression stroke, the period from injection to ignition may be short, and therefore, due to an ignition timing, a homogeneous air-fuel mixture (mixture gas of air and fuel) may be hardly formed. In addition, in some cases, fuel consumption may decrease or emission deterioration may occur.

To form homogeneous mixture gas by adjusting an ignition timing, the state of fuel to be injected and the state of a combustion chamber have to be properly controlled. For example, the spray shape of injected fuel and distribution of mixture gas in a combustion chamber may be influenced by the pressure of the fuel injected and the pressure in the combustion chamber. For example, in a case where the pressure of fuel to be injected is not properly controlled, it could be difficult to promptly form homogeneous mixture gas in a combustion chamber.

In the combustion cycle of an internal combustion engine, the pressure of fuel injected and the pressure in a combustion chamber may change transitionally. Particularly, in the case of performing fuel injection in a compression stroke in which the pressure in a combustion chamber becomes high, a change in the pressure in the combustion chamber is large. When target fuel pressure is changed according to a change in the operation state of an internal combustion engine, a case could arise where a deviation occurs between the actual fuel pressure and the target fuel pressure. The deviation between the actual fuel pressure and the target fuel pressure may exert an influence on formation of mixture gas in the combustion chamber. In the case of setting the latter half of a compression stroke as an injection timing, in order to certainly perform ignition, injection control and ignition control is may be required such that the deviation between actual fuel pressure and target fuel pressure is considered.

According to one example of the present disclosure, a combustion control device for a combustion system includes a fuel injection device to inject high-pressure fuel in a pressure accumulator into a combustion chamber of an internal combustion engine, an ignition device to ignite fuel in the combustion chamber, and a fuel pressure sensor to detect pressure of fuel to be injected into the combustion chamber. The combustion control device comprises a target set unit configured to set a target fuel pressure based on an operation state of the internal combustion engine. The combustion control device further comprises a timing computation unit configured to determine whether to execute compression latter-half injection to inject fuel in a latter half of a compression stroke of the internal combustion engine based on the operation state of the internal combustion engine and to compute an injection timing and an ignition timing of fuel. The combustion control device further comprises a timing correction unit configured to correct the injection timing of the compression latter-half injection, which is computed by the timing computation unit, to an advance side and to correct the ignition timing, which is computed by the timing computation unit, to a retard side, in a case where a detected fuel pressure detected by the fuel pressure sensor is lower than the target fuel pressure, and to correct the injection timing of the compression latter-half injection, which is computed by the timing computation unit, to the retard side and to correct the ignition timing, which is computed by the timing computation unit, to the advance side, in a case where the detected fuel pressure is higher than the target fuel pressure. The combustion control device further comprises a combustion control unit configured to control the fuel injection device and the ignition device based on the injection timing and the ignition timing.

According to the one example of the combustion control device of the present disclosure, in the case where the detected fuel pressure does not match target fuel pressure, the timing correction unit corrects an injection timing of a compression latter-half injection computed by the timing computation unit and an ignition timing. Based on the injection timing and the ignition timing properly corrected according to the detected fuel pressure and the target fuel pressure, the combustion control unit may be enabled to control the fuel injection apparatus and the ignition device. Consequently, also in the case where the state of fuel and an internal combustion engine changes transitionally and a deviation between the detected fuel pressure and the target fuel pressure occurs, the compression latter-half injection is executed while enabling to properly control the injection timing, and ignition may be properly performed.

Concretely, according to one example, when the detected fuel pressure is lower than the target fuel pressure, the timing correction unit corrects the injection timing of the compression latter-half injection computed by the timing computation unit to the advance side and corrects the ignition timing computed by the timing computation unit to the retard side. In the case where the detected fuel pressure is lower than the target fuel pressure, there is concern that by execution of injection and ignition of fuel in accordance with the injection timing and the ignition timing computed by the timing computation unit, formation of mixture gas becomes insufficient. In such a case, the injection timing of the compression latter-half injection is corrected to the advance side and the ignition timing is corrected to the retard side by the timing correction unit, so that the interval from injection of fuel to ignition becomes longer. As a result, the configuration may enable to ignite the fuel stably in a state where mixture gas is sufficiently formed.

When the detected fuel pressure is higher than the target fuel pressure, the timing correction unit corrects the injection timing of the compression latter-half injection computed by the timing computation unit to the retard side and corrects the ignition timing computed by the timing computation unit to the advance side. In the case where the detected fuel pressure is higher than the target fuel pressure, when injection and ignition of fuel are executed according to the injection timing and the ignition timing computed by the timing computation unit, the interval from injection of fuel to ignition may become long more than required. In such a case, the injection timing of the compression latter-half injection is corrected to the retard side and the ignition timing is corrected to the advance side by the timing correction unit, so that the interval from injection of fuel to ignition can be shortened. As a result, fuel may be ignited stably while assuring knocking resistance and combusted.

Figure 1:
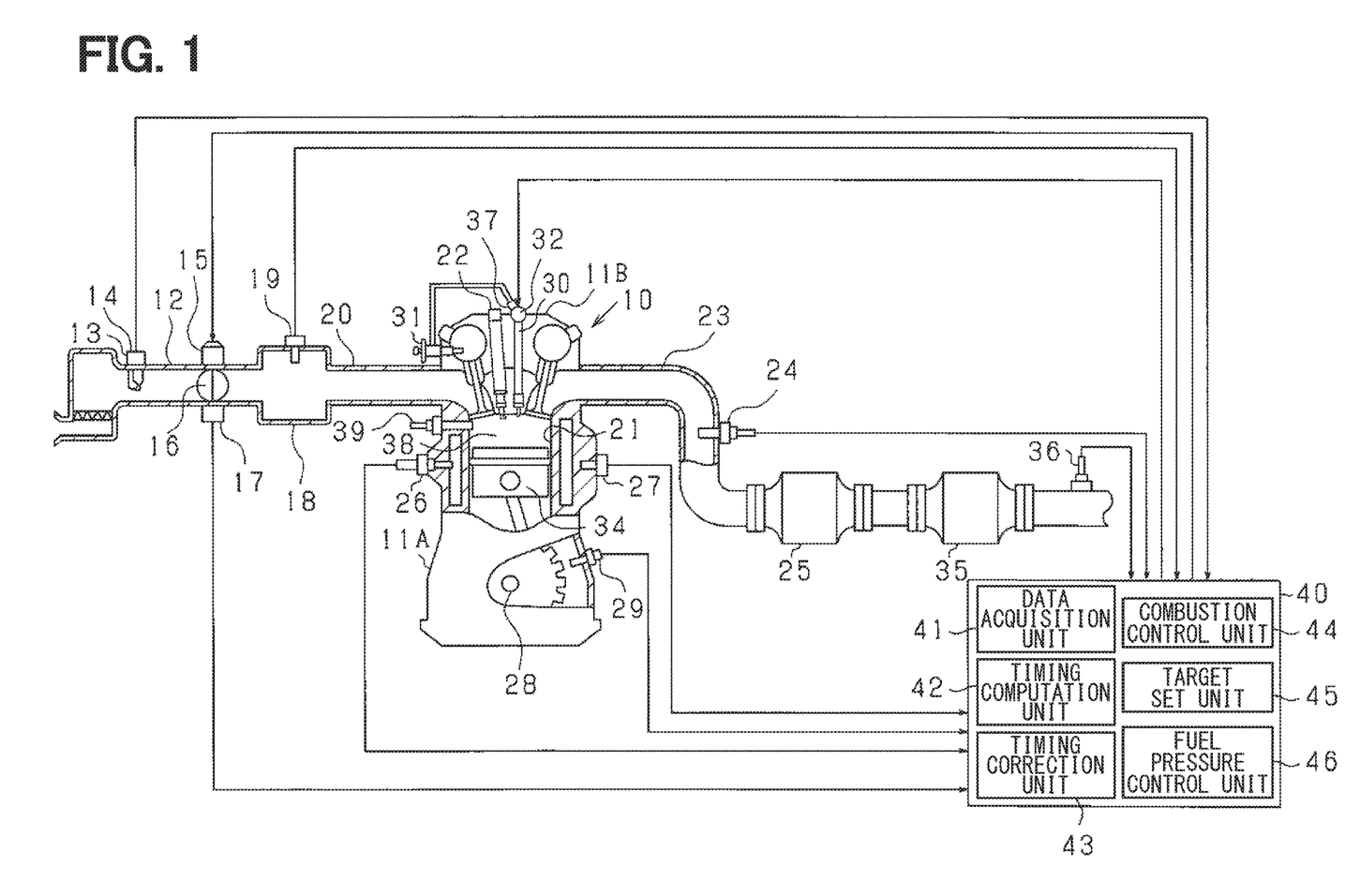
FIG. 1 is a schematic diagram of a combustion system according to an embodiment.

As illustrated in FIG. 1, a combustion system 1 is configured as a system configured to inject high-pressure fuel accumulated in a pressure accumulator 32 from a fuel injection valve 30 of a direct injection type into a combustion chamber 38 of an internal combustion engine 10 and igniting the fuel by a spark plug 22. The internal combustion engine 10 is a multi-cylinder engine of a direct injection type in which an intake stroke, a compression stroke, a combustion stroke, and an exhaust stroke are one combustion cycle. The pressure accumulator 32 is a delivery pipe and accumulates high-pressure fuel which is pressure fed from a high pressure pump 31. A fuel pressure sensor 37 to detect pressure of the fuel (fuel pressure) in the pressure accumulator 32 is provided.

In an upper stream part of an intake pipe 12 of the internal combustion engine 10, an intake flow rate sensor 13 to detect flow rate of intake air and an intake temperature sensor 14 are provided. On the downstream side, a throttle valve 16 whose angle is adjusted by a motor 15 and a throttle angle sensor 17 detecting angle (throttle angle) of the throttle valve 16 are provided.

A surge tank 18 is provided on the downstream side of the throttle valve 16, and the surge tank 18 is provided with an intake pipe pressure sensor 19 detecting pressure in the intake pipe. To the surge tank 18, an intake port 20 introducing air to the combustion chamber 38 of the internal combustion engine 10 is connected. To a cylinder head 11B of each of cylinders 21 of the internal combustion engine 10, the fuel injection valve 30 of an electromagnetic type of directly injecting fuel into the combustion chamber 38 of the cylinder 21, and the spark plug 22 are attached. Air-fuel mixture in the combustion chamber 38 is ignited by spark discharge of the spark plug 22.

An exhaust pipe 23 of the internal combustion engine 10 is provided with an A/F sensor 24 detecting air-fuel ratio of exhaust. On the downstream side of the A/F sensor 24, a catalyst layer 25 and a particulate removal layer 35 are provided. The catalyst layer 25 is a layer having an exhaust purification catalyst such as a three-way catalyst (3-way catalyst). The particulate removal layer 35 is a layer for removing mainly particulate substances in exhaust such as a gasoline particulate filter (GPF) or a 4-way GPF in which a catalyst is held in a GPF. On the downstream side of the particulate removal layer 35, a PM sensor 36 detecting concentration of particulate matter (PM) in exhaust is provided. The A/F sensor 24 and the PM sensor 36 are an example of an exhaust sensor detecting a component amount of a predetermined component in the exhaust. Alternatively or additionally, an NOx sensor, an oxygen sensor, or the like may be used.

To a cylinder block 11A of the internal combustion engine 10, a water temperature sensor 26 detecting cooling water temperature, a knock sensor 27 detecting knocking, and a combustion pressure sensor (CPS) 39 detecting pressure in the combustion chamber 38 are attached. By the rotation of a crankshaft 28, a piston 34 operates in the vertical directions in the cylinder 21. A crank angle sensor 29 outputting a pulse signal each time the crankshaft 28 rotates only by predetermined crank angle is attached to the outer periphery side of the crankshaft 28. Based on a crank angle signal of the crank angle sensor 29, the crank angle and the rotational speed of the internal combustion engine 10 are detected. Further, a combustion chamber temperature sensor which detects the temperature in the combustion chamber 38 of the internal combustion engine 10 may be provided.

Outputs of the various sensors are input to an ECU 40. The ECU 40 is an electronic control unit configured using a microcomputer as a main body and executes various controls of the internal combustion engine 10 by using detection signals of the various sensors. The ECU 40 computes a fuel injection amount according to the operation state of the internal combustion engine 10, controls fuel injection of the fuel injection valve 30, and controls the ignition timing of the spark plug 22.

The ECU 40 has a data acquisition unit 41, a timing computation unit 42, a timing correction unit 43, a combustion control unit 44, a target set unit 45, and a fuel pressure control unit 46.

The data acquisition unit 41 acquires detection values of the various sensors such as the A/F sensor 24, the PM sensor 36, the water temperature sensor 26, the intake flow rate sensor 13, the intake temperature sensor 14, the crank angle sensor 29, the fuel pressure sensor 37, and the combustion pressure sensor 39. The data acquired by the data acquisition unit 41 may be stored in the ECU 40. The data acquisition unit 41 has the functions of a fuel pressure acquisition unit that acquires a detection value of the fuel pressure sensor 37 and a combustion fluctuation acquisition unit that acquires a detection value related to combustion fluctuation such as a detection value of the combustion pressure sensor 39.

The timing computation unit 42 determines execution of compression latter-half injection of injecting fuel in the latter half of a compression stroke of the internal combustion engine 10 based on an operation state (for example, load or rotational speed) of the internal combustion engine 10. The timing computation unit 42 computes an injection timing of fuel injected by the fuel injection valve 30 and an ignition timing in the spark plug 22 based on the operation state of the internal combustion engine 10. The load of the internal combustion engine 10 may be derived, for example, based on detection values of the intake flow rate sensor 13 and the intake temperature sensor 14. Alternatively, the load of the internal combustion engine 10 may be derived from a required torque computed from the driving force of a vehicle. The rotational speed of the internal combustion engine 10 may be derived based on the detection value of the crank angle sensor 29. In the ECU 40, the load and rotational speed of the internal combustion engine 10 and a corresponding relation between the injection timing and ignition timing of fuel are preliminarily stored as a map, a mathematical expression, or the like. Referring to the map or mathematical expression, the timing computation unit 42 may compute the injection timing and the ignition timing of fuel based on the load and rotational speed of the internal combustion engine 10.

In the case where the internal combustion engine 10 is in a high-load operation state, knocking easily occurs. In the case where the injection timing of fuel is in the latter half of a compression stroke, the temperature in the combustion chamber of the internal combustion engine 10 becomes high, so that the injected fuel is vaporized rapidly, the combustion speed improves, and knocking can be suppressed. In the case where the internal combustion engine 10 is in a high-load operation state, the timing computation unit 42 determines execution of compression latter-half injection and computes the injection timing of fuel so as to be in the latter half of a compression stroke. Concretely, the computed injection timing is a timing before the ignition timing in the latter half of a compression stroke of the internal combustion engine 10. Split injection to split an injection performed in one cycle of the internal combustion engine 10 into multiple times may be performed. In this case, it is sufficient that a main injection of the largest injection amount in the plurality of times of injections split is an compression latter-half injection.

In the case where the internal combustion engine 10 is in a low-load operation state, nocking does not occur. Consequently, it is unnecessary to inject fuel in the latter half of a compression stroke for the purpose of suppressing knocking occurrence. That is, in the case where the internal combustion engine 10 is in the low-load operation state, the timing computation unit 42 determines that a compression latter-half injection is not executed, and computes the injection timing so as to be between an intake stroke and the first half of a compression stroke of the internal combustion engine 10. In the case of performing split injection, it is sufficient to set the injection timing computed with respect to the injection timing of the main injection between the intake stroke of the internal combustion engine 10 and the first half of the compression stroke.

The timing computation unit 42 may set a threshold value for the load computed based on the detection values from the various sensors and, by comparing the load and the threshold values, determine the degree of load. For example, in the case where the load of the internal combustion engine 10 is less than a predetermined threshold X, the low-load operation state is determined. In the case where the load is equal to or larger than the predetermined threshold X, a high-load operation state may be determined.

The target set unit 45 sets a target fuel pressure based on the operation state of the internal combustion engine 10. The timing computation unit 42 uses, at the time of computing the injection timing and the ignition timing of fuel, the target fuel pressure which is set by the target set unit 45. The injection timing and the ignition timing of fuel computed by the timing computation unit 42 are the timings computed based on the target fuel pressure.

The target fuel pressure may be set to a predetermined fuel pressure value Po or in a predetermined fuel pressure range which is specified by a lower limit value P1 and an upper limit value P2 of the fuel pressure. The target set unit 45 may update the target fuel pressure Po in accordance with a detected fuel pressure P detected by the fuel pressure sensor 37. For example, a target fuel pressure may be updated in a predetermined width according to a change in the operation state of the internal combustion engine, and the target fuel pressure Po may be updated at a timing when the difference between the detected fuel pressure P and the target fuel pressure Po becomes equal to or less than a predetermined value. That is, by changing the target fuel pressure Po in steps, the target fuel pressure may be held until the difference between the detected fuel pressure and the target fuel pressure becomes equal to or less than a predetermined value.

Based on input of the detected fuel pressure P from the data acquisition unit 41 and input of the target fuel pressure Po from the target set unit 45, the fuel pressure control unit 46 performs feedback control so as to make the detected fuel pressure P match the target fuel pressure Po. Concretely, based on the difference between the detected fuel pressure P and the target fuel pressure Po, output of the high pressure pump 31 is controlled.

In the case where the detected fuel pressure P does not match the target fuel pressure Po, the timing correction unit 43 corrects both the injection timing of the compression latter-half injection computed by the timing computation unit 42 and the ignition timing of fuel. The detected fuel pressure P may be a pressure of high-pressure fuel which is injected, or a fuel pressure detected in a place other than the inside of the pressure accumulator 32. For example, a sensor detecting fuel pressure in a pipe from the high pressure pump 31 to the fuel injection valve 30 may be installed and a detection value of the sensor may be used as the detected fuel pressure P.

Figure 2:
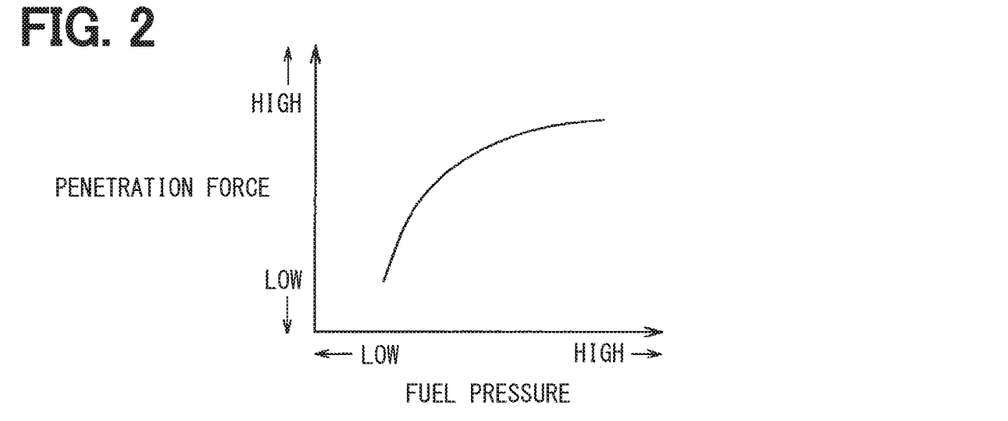
FIG. 2 is a relation diagram between fuel pressure of fuel to be injected and penetration force.

As illustrated in FIG. 2, the higher the pressure of fuel injected is, the higher the penetration force of the injection of fuel in the combustion chamber 38 becomes. The lower the penetration force of fuel in the combustion chamber 38 is, the longer the time required to make air-fuel mixture reach the spark plug 22 becomes. Consequently, in the case where the detected fuel pressure P is lower than the target fuel pressure Po (P<Po), the timing correction unit 43 corrects the injection timing of fuel computed by the timing computation unit 42 to the advance side to increase the period from the injection start timing of fuel to the ignition timing. On the other hand, in the case where the detected fuel pressure P is higher than the target fuel pressure Po is (P>Po), the timing correction unit 43 corrects the injection timing of fuel computed by the timing computation unit 42 to the retard side to shorten the period from the injection start timing of fuel to the ignition timing.

Figure 3:
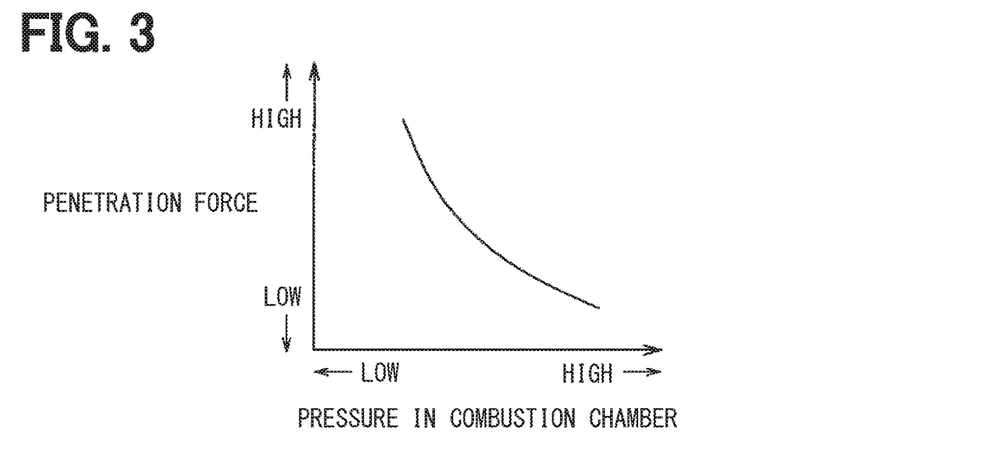
FIG. 3 is a relation diagram between pressure in a combustion chamber and penetration force of fuel to be injected.

The penetration force of the fuel injected may be detected based on the pressure in the combustion chamber 38 detected by the combustion pressure sensor 39 in addition to the detected fuel pressure P. As illustrated in FIG. 3, the higher the pressure in the combustion chamber 38 is, the lower the penetration force of the injected fuel becomes. Alternatively, a correction formula may be used for computation of the penetration force of fuel. For example, a correction in which the influence of fuel adhered in the combustion chamber is considered may be performed by using the C. F. Aquino's formula.

Figure 4:
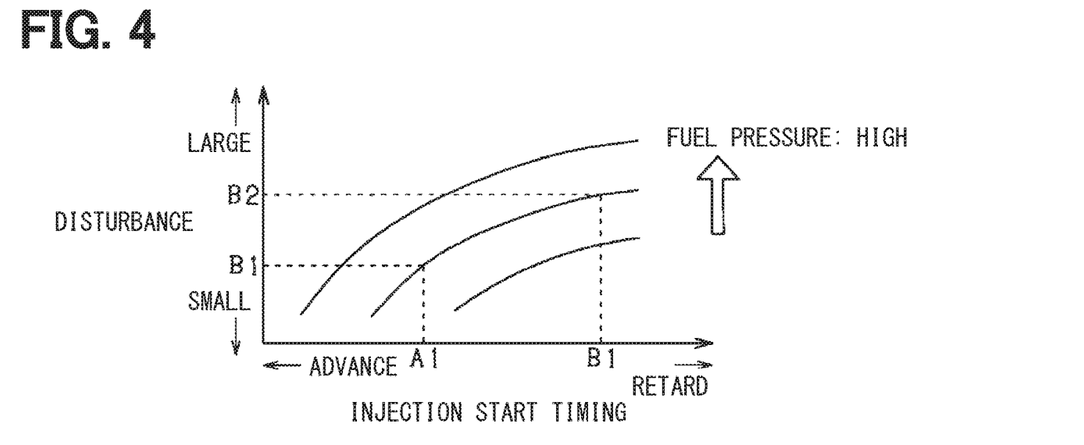
FIG. 4 is a relation diagram between injection start timing of fuel and disturbance in a combustion chamber.

The relation between the injection start timing and the ignition timing will be described with reference to FIGS. 4 to 6. As illustrated in FIG. 4, the more the injection start timing (SOI) of fuel is advanced, the smaller the disturbance in the combustion chamber 38 becomes. The more the injection start timing of fuel is retarded, the larger the disturbance in the combustion chamber 38 becomes. The higher the pressure of fuel injected is, the larger the disturbance in the combustion chamber 38 to the injection start timing becomes. From the relations illustrated in FIG. 4, disturbances B1 and B2 (B1<B2) in the combustion chamber 38 may be derived for the injection start timings A1 and A2 (A2 is on the retard side more than A1) computed by the timing correction unit 43.

Figure 5:
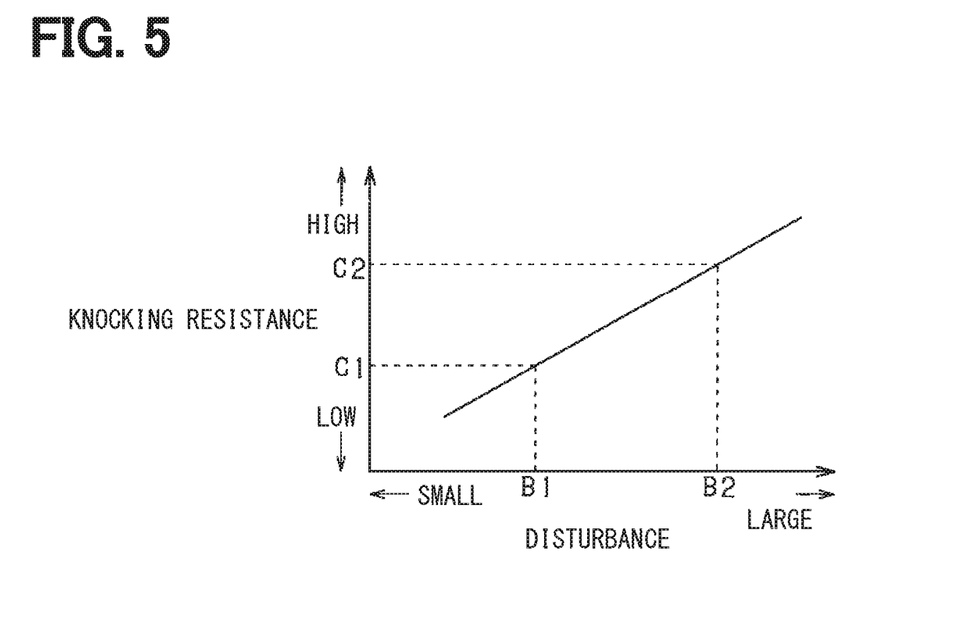
FIG. 5 is a relation diagram between disturbance in a combustion chamber and knocking resistance.

As illustrated in FIG. 5, the larger the disturbance in the combustion chamber 38 is, the more the knocking resistance improves. From the relations illustrated in FIG. 5, knocking resistances C1 and C2 (C1<C2) may be computed for the disturbances B1 and B2 in the combustion chamber 38 derived by using FIG. 4. The knocking resistances C1 and C2 correspond to the injection start timings A1 and A2 computed by the timing correction unit 43.

Figure 6:
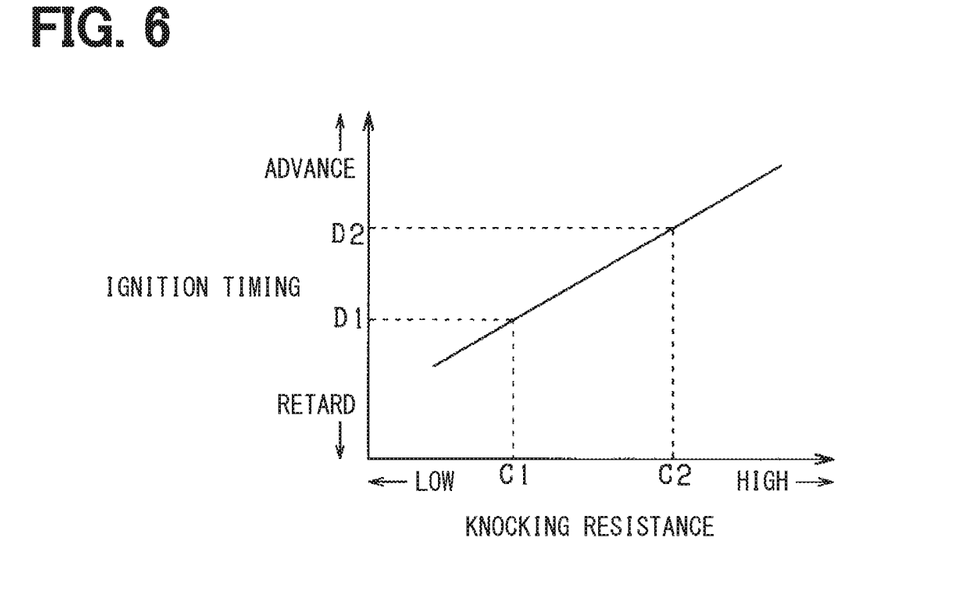
FIG. 6 is a relation diagram between knocking resistance and ignition timing.

As illustrated in FIG. 6, the more the ignition timing is advanced, the more the knocking resistance improves. For each of the knocking resistance C1 corresponding to the injection start timing A1 computed by the timing correction unit 43 and the knocking resistance C2 corresponding to the injection start timing A2, the ignition timings D1 and D2 (D2 is on the advance side more than D1) may be derived. That is, from the relations of FIGS. 4 to 6, the ignition timing D1 more to the retard side is derived for the injection start timing A1 more to the advance side, and the ignition timing D2 more to the advance side is derived for the injection start timing A2 more to the retard side.

The relations illustrated in FIGS. 4 to 6 are formed as a map or formula and stored in the ECU 40. The timing correction unit 43 may compute the ignition timing by referring to the stored map or the like based on the detected fuel pressure P, the corrected injection start timing, and the injection amount. In the ECU 40, further, a map or mathematical formula illustrating the relation between the fuel pressure or combustion pressure and penetration force illustrated in FIGS. 2 and 3 may be stored and, in addition, a correction formula such as the C. F. Aquino's formula may be stored.

When the ignition timing is acquired from the injection start timing based on the relations illustrated in FIGS. 4 to 6, the direction of correction of the injection start timing performed based on the detected fuel pressure P and the target fuel pressure Po and the direction of correction of the ignition timing become opposite to each other. By determining the direction of correction (advance direction or retard direction) of each of the injection timing and the ignition timing as described above, both reliable ignition and assurance of knocking resistance may be realized.

Concretely, when the detected fuel pressure P is lower than the target fuel pressure Po, the timing correction unit 43 corrects the fuel injection timing computed by the timing computation unit 42 to the advance side and corrects the fuel injection timing computed by the timing computation unit 42 to the retard side. When the detected fuel pressure P is higher than the target fuel pressure Po, the timing correction unit 43 corrects the fuel injection timing computed by the timing computation unit 42 to the retard side and corrects the fuel injection timing computed by the timing computation unit 42 to the advance side. By performing correction in such a manner, while reliably igniting fuel, knocking resistance can be assured.

In the case where the detected fuel pressure P is included in the target fuel pressure Po, the timing correction unit 43 does not correct the injection timing and the ignition timing of fuel computed by the timing computation unit 42.

The correction amount of the injection timing is computed based on the difference between the detected fuel pressure P and the target fuel pressure Po. Consequently, the fuel injection timing corrected by the timing correction unit 43 corresponds to the fuel injection timing computed based on the detected fuel pressure P. In the specification, hereinafter, a correction amount of correction to the advance side by the timing correction unit 43 will be referred to as an advance correction amount, and a correction amount of correction to the retard side will be referred to as a retard correction amount.

The correction amount of the ignition timing is computed based on the knocking resistance computed based on the injection timing corrected by the timing correction unit 43. As illustrated in FIGS. 4 to 6, as the correction amount of the injection timing increases, the correction amount of the ignition timing may be increased. That is, the larger the difference between the detected fuel pressure P and the target fuel pressure Po is, the more the correction amount of the ignition timing may be increased. In this case, as a deviation amount |P−Po| as the absolute value of the difference between the detected fuel pressure P and the target fuel pressure Po increases, the advance correction amount or the retard correction amount of the injection timing becomes larger, and the retard correction amount or the advance correction amount of the ignition timing increases.

Alternatively, by correction to an ignition timing which is close to MBT (Minimum spark advance for Best Torque) as much as possible within a range in which knocking resistance can be assured based on the relations of FIG. 6, a high output of the internal combustion engine 10 can be assured while suppressing knocking. In this case, a change in the correction amount of the ignition timing does not always correspond to a change in the correction amount of the injection timing, furthermore, a change in the deviation amount |P−Po|.

In the case where the injection timing is corrected to the advance side by the timing correction unit 43, preferably, the timing correction unit 43 splits the compression latter-half injection to a main injection and a sub injection whose fuel amount is smaller than that of the main injection under condition that the advance amount of the injection timing exceeds a predetermined threshold Y. The threshold Y may be, for example, a maximum advance amount which may be set in the internal combustion engine 10. In the case where the advance amount of the injection timing exceeds the predetermined threshold Y, a state in which a flag of splitting an injection is set may be set.

The timing correction unit 43 splits the compression latter-half injection to a main injection and a sub injection which is executed after the main injection under condition that a combustion fluctuation of the internal combustion engine 10 exceeds a predetermined threshold Z. In the main injection, most of fuel injected in one combustion cycle of the internal combustion engine 10 is injected. In the sub injection, the fuel of an amount smaller than that in the main injection is injected. Split injection may be performed. By splitting the injection, combustion fluctuation is suppressed and stability of combustion in the internal combustion engine 10 can be assured.

For example, the combustion fluctuation may be evaluated by fluctuation of torque of the internal combustion engine 10 or fluctuation width of combustion pressure. The torque fluctuation may be estimated from, for example, the rotation speed of the internal combustion engine 10 detected by the crank angle sensor 29. The combustion pressure fluctuation may be acquired from a detection value of the combustion pressure sensor 39. The combustion fluctuation may be acquired as fluctuation of torque or fluctuation of combustion pressure in the data acquisition unit 41. That is, the data acquisition unit 41 may have a function of a fuel pressure fluctuation acquisition unit.

The timing correction unit 43 computes an injection timing and an injection amount on each of split injections. In the case of performing split injection, it is preferable to set the injection timing of sub injection immediately before ignition of the internal combustion engine 10. The timing immediately before ignition is a period from start time of the latter half of a compression stroke of the internal combustion engine 10 to a timing immediately before the ignition and may be after the piston 34 passes the top dead center as long as it is before the ignition timing. It is preferable that the injection condition of a sub injection is set so that air-fuel mixture of a predetermined air fuel ratio which enables weak stratified charge combustion may be formed around the spark plug 22 by the sub injection. By promptly forming the air-fuel mixture of a predetermined air fuel ratio around the tip part of the spark plug 22 by performing the sub injection, while suppressing an advance correction amount of the injection timing of the main injection, ignition can be performed stably.

The combustion control unit 44 controls the fuel injection valve 30 and the spark plug 22 based on an injection timing and an ignition timing computed or corrected, injects fuel into the combustion chamber 38, and ignites the fuel in the combustion chamber 38. In the case where the injection timing and the ignition timing of fuel are corrected by the timing correction unit 43, the combustion control unit 44 controls the fuel injection valve 30 and the spark plug 22 based on the injection timing and the ignition timing of fuel corrected by the timing correction unit 43. In the case where correction by the timing correction unit 43 is not performed, the combustion control unit 44 controls the fuel injection valve 30 and the spark plug 22 based on the injection timing and the ignition timing of fuel computed by the timing computation unit 42.

Figure 7:
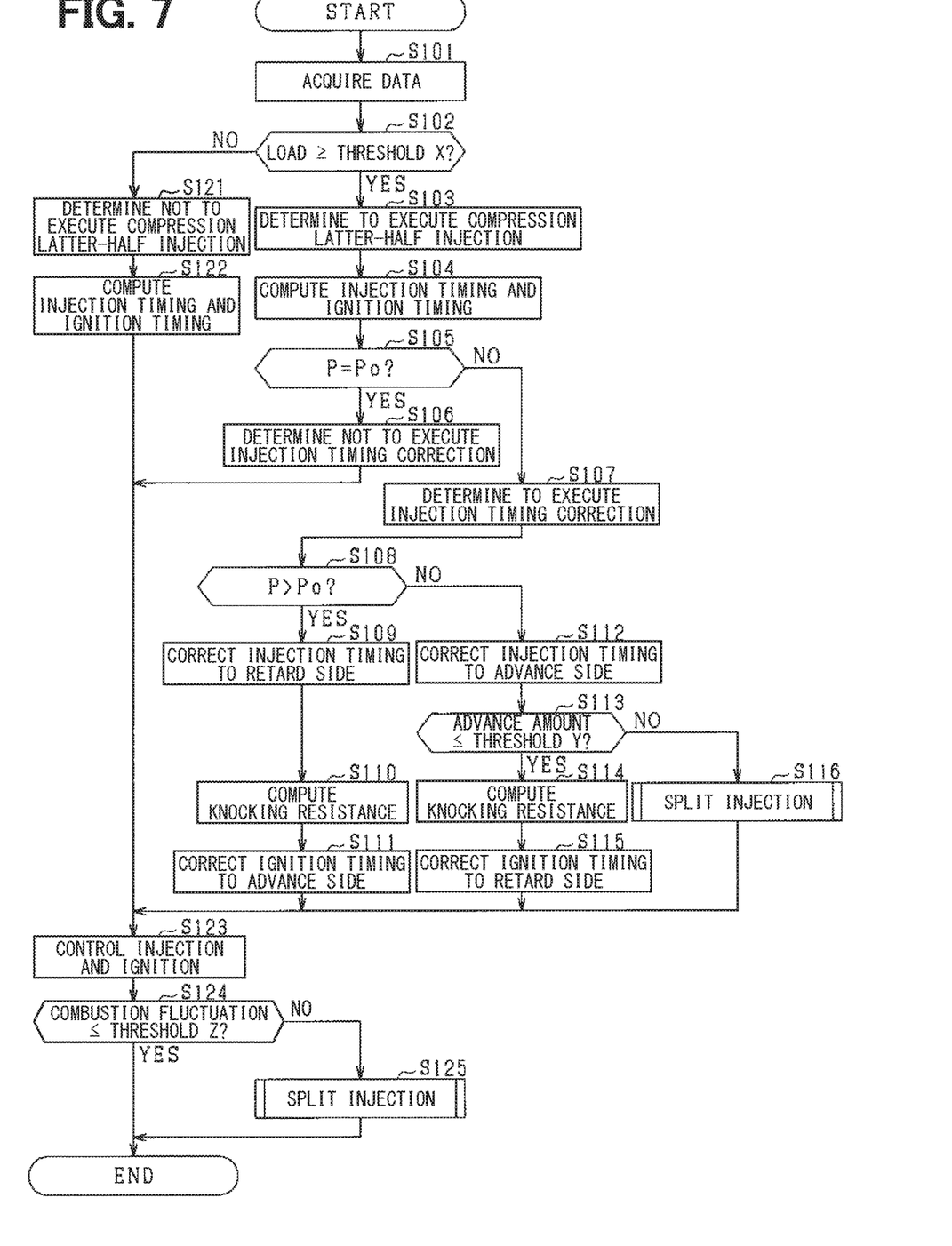
FIG. 7 is a flowchart of combustion control process executed by an ECU.

FIG. 7 is a flowchart of combustion control process executed by the ECU 40. First, in step S101, detection values of various sensors such as the fuel pressure sensor 37 and the combustion pressure sensor 39 are acquired. The process advances to step S102.

In step S102, whether the load of the internal combustion engine 10 is equal to or less than a predetermined threshold X is determined. The load of the internal combustion engine 10 may be computed, for example, based on a request torque. In a high-load state of load≥threshold X of the internal combustion engine 10, the process advances to step S103 where execution of compression latter-half injection is determined. That is, it is determined to execute fuel injection in the latter half of a compression stroke, and the process advances to step S104.

In a low-load state of load<threshold X of the internal combustion engine 10, the process advances to step S121 where it is determined not to execute compression latter-half injection. That is, it is determined to execute the fuel injection between the intake stroke and the first half of the compression stroke. Further, the process advances to step S122 where the injection timing and the ignition timing of fuel are computed, and advances to step S123.

In step S104, the injection timing and the ignition timing of fuel are computed. The process advances to step S105. In step S105, the target fuel pressure Po is set based on the fuel injection timing computed in step S104. Whether the detected fuel pressure P (the detection value of the fuel pressure sensor 37) acquired in step S101 matches the target fuel pressure or not is determined.

When the detected fuel pressure P matches the target fuel pressure Po (P=Po) in step S105, the process advances to step S106 in which it is determined not to correct the injection timing and the ignition timing, and advances to step S123. When the detected fuel pressure P does not match the target fuel pressure Po (in the case of P<Po or P>Po) in step S105, the process advances to step S107 in which it is determined to correct the injection timing and the ignition timing, and advances to step S107.

In step S108, whether the detected fuel pressure P exceeds the target fuel pressure Po or not is determined. That is, with respect to the detected fuel pressure P, whether P>Po or not is determined.

In the case of detected fuel pressure P>target fuel pressure Po, the process advances to step S109 in which the injection timing is corrected to the retard side. The retard correction amount of the injection timing is computed based on a deviation amount between the detected fuel pressure P and the target fuel pressure Po, that is, |P−Po| as the absolute value of the fuel pressure difference P−Po. The larger the deviation amount |P−Po| is, the larger the retard correction amount of the injection timing becomes.

The process advances from step S109 to step S110 in which knocking resistance is computed for the corrected injection timing and, after that, advances to step S111. In the ECU 40, the relations illustrated in FIGS. 4 to 6 are stored as a formula or map. Based on the detected fuel pressure P and the fuel injection start timing and the injection amount after correction, disturbance in the combustion chamber 38 is computed, and knocking resistance is computed.

In step S111, according to the knocking resistance computed in step S110, the ignition timing is corrected to the advance side. By retard correction of the injection timing, disturbance in the combustion chamber is promoted, and knocking resistance improves. Based on the relations illustrated in FIG. 6, the advance amount of the ignition timing may be computed from the knocking resistance. After the injection timing and the ignition timing are corrected in steps S109 to S111, the process advances to step S123.

In the case of detected fuel pressure P<target fuel pressure Po, the process advances to step S112, and the injection timing is corrected to the advance side. The advance correction amount of the injection timing is computed based on the deviation amount |P−Po| between the detected fuel pressure P and the target fuel pressure Po. The larger the deviation amount |P−Po| is, the more the advance correction amount of the injection timing increases.

The process advances from step S112 to step S113, and whether the advance amount in the corrected injection timing is equal to or less than the predetermined threshold Y or not is determined. The threshold Y is a maximum advance amount which may be set with respect to the internal combustion engine 10. When the advance angle of the injection timing is equal to or less than the predetermined threshold Y, the process advances to step S114. When the advance amount of the injection timing exceeds the predetermined threshold Y, the process advances to step S116.

In step S114, knocking resistance is computed for the corrected injection timing by a method similar to step S110. After that, the process advances to step S116. In step S115, the ignition timing is retard corrected in accordance with the knocking resistance computed in step S114. By the advance correction of the injection timing, disturbance in the combustion chamber attenuates and the knocking resistance decreases. Based on the relations illustrated in FIG. 6, the retard amount of the ignition timing may be computed from the knocking resistance. After correcting the injection timing and the ignition timing in steps S112 to S115, the process advances to step S123.

Figure 8:
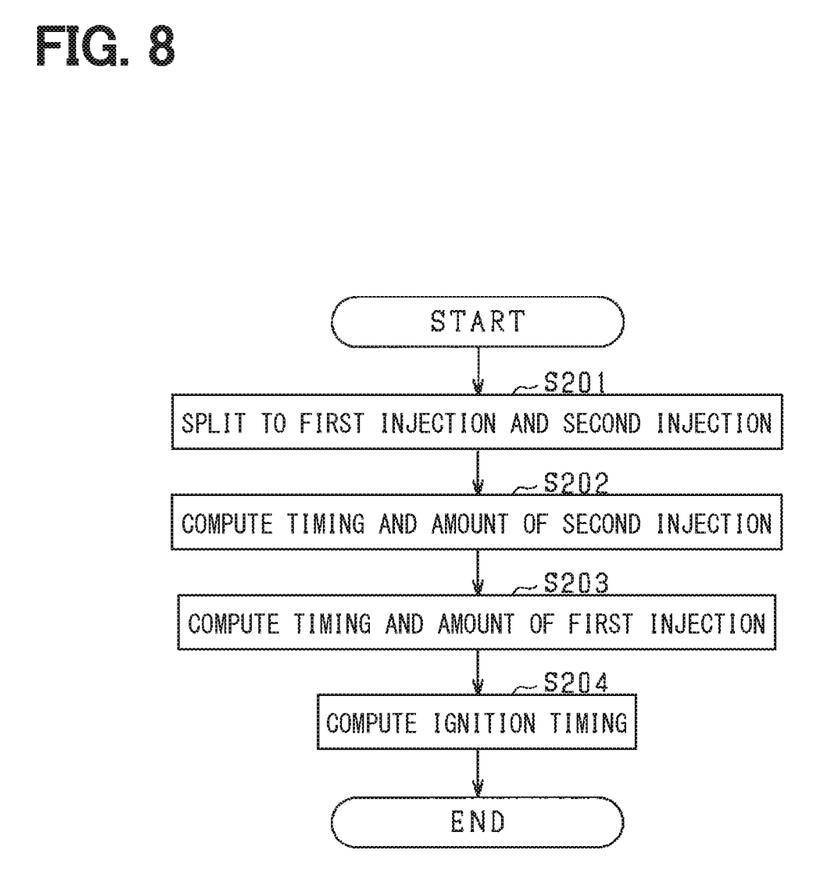
FIG. 8 is a flowchart of injection splitting process in the flowchart of FIG. 7.

In step S116, injection splitting process illustrated in FIG. 8 is executed for compression latter-half injection. In the injection splitting process, first, in step S201, injection computed as a single injection is split to a first injection and a second injection. The first injection is a main injection of injecting most of fuel which is injected in one combustion cycle of the internal combustion engine 10. The second injection is a sub injection of a small amount executed immediately before ignition. By performing the second injection, an air-fuel mixture of a predetermined air-fuel ratio is formed around the tip part of the spark plug 22, and weak stratified charge combustion may be realized.

The process advances from step S201 to step S202 and, first, the injection timing and the injection amount of the second injection are computed. Next, the process advances to step S203, and the injection timing and the injection amount of the first injection are computed. The injection amount of the first injection may be acquired, for example, by computing the difference between the injection amount before the splitting and the injection amount of the second injection computed in step S202.

Next, the process advances to step S204, the ignition timing of each of the first and second injections is computed, and the injection splitting process is finished. After finishing the processes illustrated in FIG. 8, the process advances to step S123 illustrated in FIG. 7.

In step S123, according to the injection timing and the ignition timing computed according to the load of the internal combustion engine 10 and properly corrected under a predetermined condition, the fuel injection valve 30 and the spark plug 22 are controlled. By the operation, fuel is injected from the fuel injection valve 30 into the combustion chamber 38, and the fuel injected into the combustion chamber 38 is ignited by the spark plug 22. After that, the process advances to step S124.

In step S124, whether a parameter indicating combustion fluctuation is equal to or less than the predetermined threshold Z is determined. As the parameter indicating combustion fluctuation, at least one of torque and combustion pressure of the internal combustion engine 10 may be used. More concretely, a fluctuation amount is computed by using a detection value of at least one of the crank angle sensor 29 and the combustion pressure sensor 39, and whether the fluctuation amount is equal to or less than the predetermined threshold Z or not is determined. The threshold Z is set according to each of the parameters indicating the combustion fluctuations.

In the case where the combustion fluctuation exceeds the threshold Z in step S124, the process advances to step S125. In step S125, splitting process of an injection similar to the processes illustrated in FIG. 8 is performed. After that, the process is finished. By splitting the injection in step S125, vaporization ratio of fuel in the combustion chamber 38 is improved. Consequently, the combustion fluctuation may be reduced. When the combustion fluctuation is equal to or less than the threshold Z, without performing step S125, the process is finished.

Using the case where the combustion system 1 is mounted in a vehicle as an example, the behavior of the combustion system 1 realized by the above-described control will be described with reference to the time charts of FIG. 9. In the time charts of FIG. 9, the horizontal axis indicates a time axis, and the vertical axes indicate, in order from the top of the diagram, required torque, compression latter-half injection execution flag, target fuel pressure Po and detected fuel pressure P, fuel pressure difference P−Po, injection start timing (corrected SOI) corrected based on the detected fuel pressure P and target injection start timing (target SOI), injection start timing (final SOI) and target SOI which are set at the time of injection execution, injection split execution flag, and ignition timing correction amount.

When a vehicle starts acceleration at time t0, the required torque to the internal combustion engine 10 starts increasing. In a period from time t0 to time t4, the required torque increases.

At time t1, the required torque reaches the predetermined threshold X and the internal combustion engine 10 enters a high-load operation state, so that the injection retard execution flag turns on. In response to the turn-on of the injection retard execution flag, the target fuel pressure Po is set according to the required torque, and the target SOI is computed. In the period from time t1 to time t3, the target fuel pressure Po and the target SOI are set to a predetermined value.

At time t1, the detected fuel pressure P is lower than the target fuel pressure Po, and the fuel pressure difference P−Po is a negative value. The correction SOI is corrected to the advance side more than the target SOI only by a correction amount according to a deviation amount |P−Po|. The difference between the target SOI and the correction SOI is an advance correction amount computed based on the deviation amount |P−Po|. Since the advance amount in the correction SOI exceeds a predetermined threshold Y (maximum advance amount), the injection split flag turns on. As a result that the injection split flag turns on and the injection start timing is computed for each of the first injection (main injection) and the second injection (sub injection) which are split, the final SOI of the first injection executed as the compression latter-half injection matches the target SOI. That is, as a result, correction of the injection timing is not performed, and correction of the ignition timing is not also performed.

In the period from time 1t to time t2, by feedback control, the detected fuel pressure P increases toward the target fuel pressure Po. According to it, the fuel pressure difference P−Po changes from a negative value toward zero, and the deviation amount |P−Po| decreases. According to the decrease in the deviation amount |P−Po|, the advance correction amount decreases, and the correction SOI becomes closer to the target SOI.

At time t2, the advance angle of the corrected SOI becomes equal to or less than the threshold Y, so that the injection split flag turns off, and the final SOI matches the corrected SOI. Based on the knocking resistance computed according to the corrected SOI, the ignition timing is corrected to the retard side. In the period from time t2 to time t8, the injection split flag is off, and the final SOI matches the corrected SOI. Consequently, description on the final SOI will be omitted.

In the period from time t2 to time t3, by feedback control, the detected fuel pressure P increases toward the target fuel pressure Po. With the increase, the fuel pressure difference P−Po changes from a negative value toward zero, and the deviation amount |P−Po| decreases. According to decrease in the deviation amount |P−Po|, the advance correction amount decreases, the corrected SOI becomes close to the target SOI, and the retard correction amount of the ignition timing decreases.

At time t3, the detected fuel pressure P reaches the target fuel pressure Po, and the target fuel pressure Po and the target SOI are updated according to the required torque. The target fuel pressure Po increases in steps, and the retard amount of the target SOI increases in steps. As the target fuel pressure Po increases in steps, the fuel pressure difference P−Po becomes zero one and, after that, changes in steps to a negative value. The corrected SOI is corrected from the target SOI to the advance side only by the amount of an advance correction amount computed according to the deviation amount |P−Po|. Based on knocking resistance computed according to the corrected SOI, the ignition timing is corrected to the retard side.

In the period from time t3 to t4, by feedback control, the detected fuel pressure P increases toward the target fuel pressure Po. With the increase, the fuel pressure difference P−Po increases from a negative value toward zero. The advance correction amount in the corrected SOI decreases according to the deviation amount |P−Po|, the corrected SOI becomes closer to the target SOI, and the retard correction amount of the ignition timing decreases.

At time t4, the detected fuel pressure P reaches the target fuel pressure Po, and the target fuel pressure Po and the target SOI are updated according to the required torque. The target fuel pressure Po increases in steps, and the retard amount of the target SOI increases in steps. By the change of the target fuel pressure Po in steps, the fuel pressure difference P−Po becomes zero once and, after that, changes in steps to a negative value. The corrected SOI is corrected to the advance side more than the target SOI only by the advance correction amount computed according to the deviation amount |P−Po|. Based on knocking resistance computed according to the corrected SOI, the ignition timing is corrected to the retard side.

In the period from time t4 to t5, by feedback control, the detected fuel pressure P increases toward the target fuel pressure Po. With the increase, the fuel pressure difference P−Po increases from a negative value toward zero. The advance correction amount in the corrected SOI decreases according to the deviation amount |P−Po|, the corrected SOI becomes closer to the target SOI, and the retard correction amount of the ignition timing decreases.

At time t5, the detected fuel pressure P reaches the target fuel pressure Po. Since the required torque is constant in the period from time t4 to t6, the target fuel pressure Po and the target SOI are not updated. Consequently, in the period from time t5 to t6, the fuel pressure difference P−Po is zero, and correction of the injection timing and the ignition timing is not performed. That is, the corrected SOI and the final SOI match the target SOI, and the correction amount of the ignition timing is zero.

At time t6, when the vehicle starts deceleration, the required torque to the internal combustion engine 10 starts decreasing. In the period of time t6 to t8, the required torque decreases. The target fuel pressure Po and the target SOI are updated according to the required torque, and the detected fuel pressure P becomes higher than the target fuel pressure Po. The fuel pressure difference P−Po becomes a positive value, and the corrected SOI is corrected to the retard side more than the target SOI only by the amount of the retard correction amount computed according to the deviation amount |P−Po|. Based on the knocking resistance computed by the corrected SOI, the ignition timing is corrected to the advance side.

In the period from time t6 to t7, by the feedback control, the detected fuel pressure P decreases toward the target fuel pressure Po. According to the decrease, the fuel pressure difference P−Po decreases from a positive value toward zero. The retard correction amount in the corrected SOI decreases according to the deviation amount |P−Po|, the corrected SOI comes closer to the target SOI, and the advance correction amount of the ignition timing decreases.

At time t7, by the feedback control, the detected fuel pressure P reaches the target fuel pressure Po, and the target fuel pressure Po and the target SOI are updated according to the required torque. The target fuel pressure Po decreases in steps, and the target SOI decreases in steps by the retard amount. By the change in steps of the target fuel pressure Po, the fuel pressure difference P−Po becomes zero once and, after that, changes in steps to a positive value. The corrected SOI is corrected to the retard side more than the target SOI only by the amount of the retard correction amount computed according to the deviation amount |P−Po|. Based on the knocking resistance computed according to the corrected SOI, the ignition timing is corrected to the advance side.

In the period between the timing t7 and t8, by the feedback control, the detected fuel pressure P decreases toward the target fuel pressure Po. According to the decrease, the fuel pressure difference P−Po decreases from a positive value toward zero. The retard correction amount in the corrected SOI decreases according to the deviation amount |P−Po|, and the advance correction amount of the ignition timing decreases.

At time t8, the required torque becomes less than the predetermined threshold X and the internal combustion engine 10 becomes not in the high-load operation state, so that the execution flag of the compression latter-half injection turns off. In response to turn-off of the execution flag of the compression latter-half injection, the process of correcting the injection timing and the ignition timing is stopped.

Figure 9:
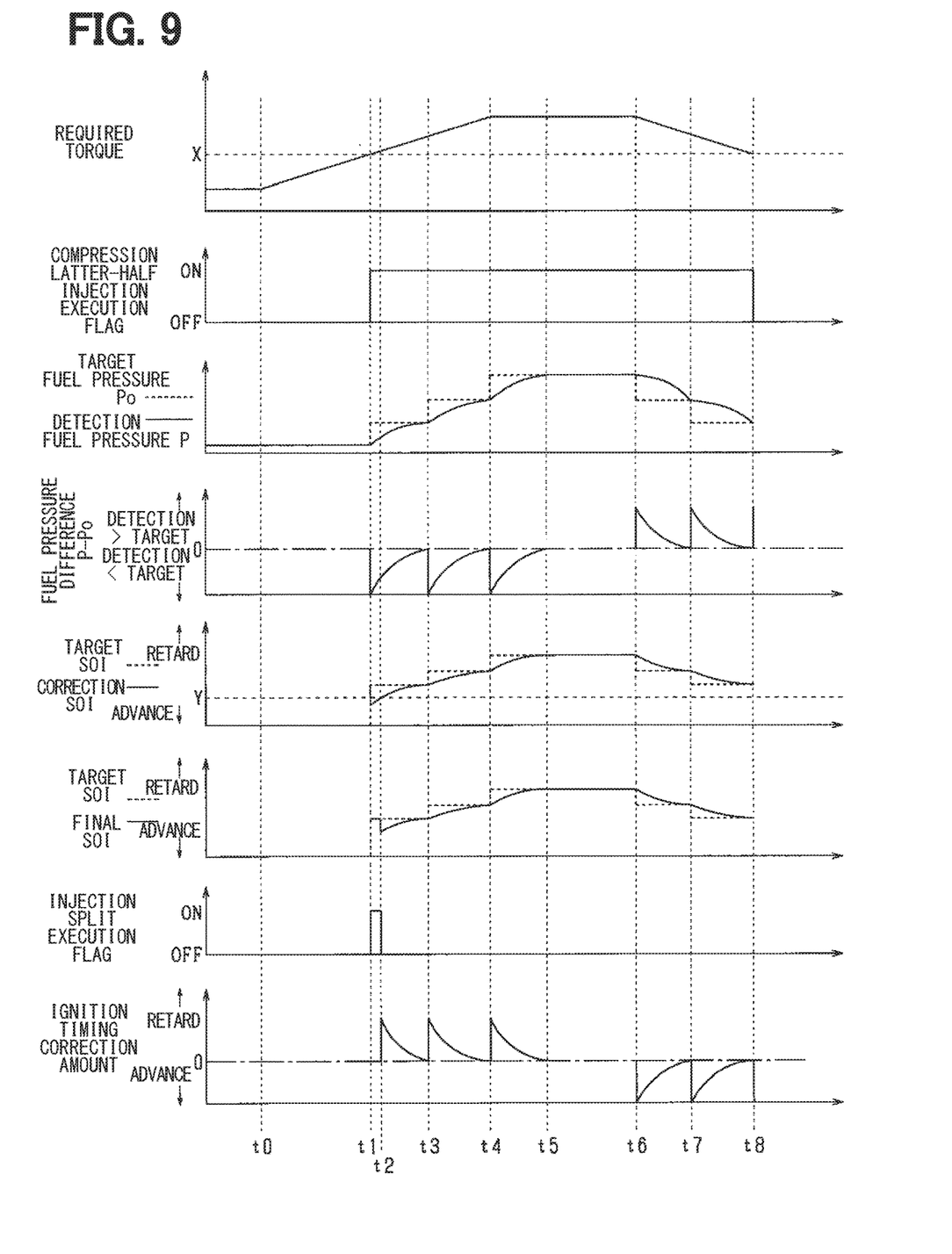
FIG. 9 is a time chart in a combustion system according to an embodiment.

As illustrated in FIG. 9, the target fuel pressure Po is updated in steps according to the required torque which changes linearly. The target fuel pressure Po is updated at the timing when the difference between the detected fuel pressure P and the target fuel pressure Po becomes zero. Consequently, in the case where the requested torque changes transitionally, in the period in which the target fuel pressure Po is held, the correction amount of the injection timing and the correction amount of the ignition timing are gradually decreased as the detected fuel pressure P becomes closer to the target fuel pressure Po. As a result, in the injection timing and the ignition timing, the correction amount does not become excessively large. Therefore, deterioration in drivability by correction in the injection timing and the ignition timing can be suppressed.

By the embodiment, the following effects can be acquired.

The timing computation unit 42 determines execution of the compression latter-half injection based on the operation state of the internal combustion engine 10 and computes the injection timing and the ignition timing of fuel. In the case where the detected fuel pressure P detected by the fuel pressure sensor 37 is lower than the target fuel pressure Po, the timing correction unit 43 corrects the injection timing of the compression latter-half injection computed by the timing computation unit 42, and corrects the ignition timing computed by the timing computation unit 42 to the retard side. In the case where the detected fuel pressure P is higher than the target fuel pressure Po, the timing correction unit 43 corrects the injection timing of the compression latter-half injection computed by the timing computation unit 42 to the retard side, and corrects the ignition timing computed by the timing computation unit 42 to the advance side. For the injection timing and the ignition timing of the compression latter-half injection computed by the timing computation unit 42, the timing correction unit 43 performs correction so that the direction of correction of the injection start timing and the direction of correction of the ignition timing performed based on the detected fuel pressure P and the target fuel pressure Po become opposite. By the operation, both reliable ignition and assurance of knocking resistance can be realized.

The correction amount of the injection timing is computed based on the absolute value (deviation amount) of the difference between the detected fuel pressure P and the target fuel pressure Po. Consequently, the correction can be performed to a proper injection timing according to the detected fuel pressure P.

The correction amount of the ignition timing may be computed based on the injection timing corrected by the timing correction unit 43. Concretely, based on the relations illustrated in FIGS. 4 to 6, knocking resistance is computed from the corrected injection start timing. From the knocking resistance, the ignition timing is computed. Consequently, the ignition timing can be adjusted within the range in which knocking resistance can be maintained.

Under condition that the combustion fluctuation of the internal combustion engine 10 exceeds the predetermined threshold Z, the timing correction unit 43 splits a single fuel injection computed by the timing computation unit 42 into a plurality of times and performs correction to the injection timing to each of the split injections. Consequently, the combustion fluctuation is suppressed and stability of combustion in the internal combustion engine 10 can be assured.

In the case of performing a main injection and a sub injection as split injections, the timing correction unit 43 sets the injection timing of the sub injection immediately before ignition of the internal combustion engine 10. Further, the timing correction unit 43 sets an injection condition so that an air-fuel mixture of a predetermined air-fuel ratio which enables a weak stratified change combustion can be formed around the spark plug 22 by the sub injection. Consequently, ignition of fuel can be executed more reliably.

The target set unit 45 updates the target fuel pressure Po in predetermined width in steps with a change in the operation state of the internal combustion engine 10 and holds the target fuel pressure Po until the difference between the detected fuel pressure P and the target fuel pressure Po becomes equal to or less than a predetermined value. By the operation, at the time of transient operation of the internal combustion engine 10, in a period in which the target fuel pressure Po is held, the correction amount of the injection timing and the correction amount of the ignition timing are gradually decreased as the detected fuel pressure P becomes closer to the target fuel pressure Po. As a result, excessive correction of the injection timing and the ignition timing is suppressed. It enables to suppress deterioration of drivability.

The combustion control device of the present disclosure may be applied to not only a gasoline engine but also a diesel engine. That is, the present disclosure may be applied to a combustion control device controlling a combustion system of a diesel engine of a direct injection type.

Although the present disclosure is described according to the embodiment, it is to be understood that the present disclosure is not limited to the embodiment and structures. The present disclosure includes various modifications and also modifications within an equivalence range. In addition, various combinations and modes, further, other combinations and modes including only one element, or more or less than it are also within the scope and the idea range of the present disclosure.

What is claim is:

1. A combustion control device for a combustion system, the combustion system including a fuel injection device to inject high-pressure fuel in a pressure accumulator into a combustion chamber of an internal combustion engine, an ignition device to ignite fuel in the combustion chamber, and a fuel pressure sensor to detect pressure of fuel to be injected into the combustion chamber, the combustion control device comprising:
   a target set unit configured to set a target fuel pressure based on an operation state of the internal combustion engine;
   a timing computation unit configured
      to determine whether to execute compression latter-half injection to inject fuel in a latter half of a compression stroke of the internal combustion engine based on the operation state of the internal combustion engine and
      to compute an injection timing and an ignition timing of fuel;
   a timing correction unit configured,
      to correct the injection timing of the compression latter-half injection, which is computed by the timing computation unit, to an advance side and to correct the ignition timing, which is computed by the timing computation unit, to a retard side, in a case where a detected fuel pressure detected by the fuel pressure sensor is lower than the target fuel pressure, and to correct the injection timing of the compression latter-half injection, which is computed by the timing computation unit, to the retard side and to correct the ignition timing, which is computed by the timing computation unit, to the advance side, in a case where the detected fuel pressure is higher than the target fuel pressure; and a combustion control unit configured to control the fuel injection device and the ignition device based on the injection timing and the ignition timing.

2. The combustion control device according to claim 1, wherein the timing correction unit is configured to compute a correction amount for the injection timing of the compression latter-half injection, which is computed by the timing computation unit, based on the difference between the detected fuel pressure and the target fuel pressure.

3. The combustion control device according to claim 1, wherein the timing correction unit is configured to split the compression latter-half injection into a main injection and a sub injection, in which an injection amount of fuel is smaller than an injection amount in the main injection, on condition that an advance amount of the injection timing exceeds a threshold.

4. The combustion control device according to claim 1, further comprising:

a combustion fluctuation acquisition unit configured to acquire a combustion fluctuation of the internal combustion engine, wherein the timing correction unit is configured to split the compression latter-half injection into a main injection and a sub injection, in which an injection amount of fuel is smaller than an injection amount of fuel in the main injection, on condition that the combustion fluctuation of the internal combustion engine exceeds a predetermined value.

5. The combustion control device according to claim 3, wherein the timing correction unit is configured to set the injection timing of the sub injection immediately before the ignition timing of the internal combustion engine.

6. The combustion control device according to claim 1, wherein the target set unit is configured to update the target fuel pressure in a predetermined width according to a change in the operation state of the internal combustion engine and to hold the target fuel pressure until the difference between the detected fuel pressure and the target fuel pressure becomes equal to or less than a predetermined value.

\* \* \* \* \*